Patented Jan. 8, 1946

2,392,578

UNITED STATES PATENT OFFICE 2,392,578

METHOD OF FORMING RIGID SHEETS OF POLYMERIZED UNSATURATED COMPOUNDS

Albert G. Chenicek, Barberton, Ohio, assignor to Pittsburgh Plate Glass Company, Pittsburgh, Pa., a corporation of Pennsylvania No Drawing. Application June 16, 1941, Serial No. 398,316

6 Claims. (Cl. 18—55)

The invention relates to the polymerization of a polymerizable organic compound which contains at least two polymerizable unsaturated groups which are preferably unconjugated with respect to carbon and is particularly related to the polymerization of esters and ester amides which contain at least two polymerizable unsaturated groups. In the polymerization of such materials, it has been found that the production of desirable products is exceedingly difficult for the reason that the final polymerization products are generally badly cracked and often contain many bubbles which are formed during polymerization. For this reason, cast polymerization of such compounds has not achieved commercial success.

In accordance with the present invention, these difficulties have been avoided and clear, transparent polymers of any desired shape which are free from cracks and bubbles and surface imperfections have been produced. The polymerization of the materials herein contemplated appears to proceed through a plurality of stages. When polymerization is first initiated, the monomer thickens to a viscous syrup which is probably a solution of fusible polymer dissolved or dispersed in the monomer. This fusible polymer is generally soluble in many organic solvents. As polymerization proceeds further, a solid or semisolid gel is formed. This product probably comprises a mixture of monomer and polymer and possesses many of the following characteristics: at least a portion of this gel is found to be substantially insoluble in the common organic solvents such as xylene or acetone and merely swells when subjected to the action of such solvents. Generally, the polymer in the gel comprises a mixture of soluble and insoluble constituents and the two may be separated by extraction with solvents. In most cases, the quantity of insoluble material in the gel is large, often being about 20 to 75 percent by weight of the total mixture.

Ordinarily the gels do not possess a substantial rigidity and generally, a flat sheet thereof may be bent or curved to a substantial degree without fracture. For example, ethylene glycol bis (methallyl carbonate) may be polymerized to form a sheet of polymer ⅛ inch in thickness, 12 inches long and 2 inches wide and containing about 50 percent of insoluble matter, which may be lapped upon itself to form a cylindrical section. In some cases, particularly when the percentage of insolubility is high, the gel may possess considerable stiffness and be incapable of being bent in this manner. The gels are usually weak, do not possess a high tensile strength and tear or crumble readily.

These polymerization products may be further polymerized to form hard, tough polymers which are considerably less brittle than glass and more resistant to shattering. Such polymers which may be termed "glassy" polymers, have high tensile strength and have many of the properties characteristic of other organic glasses. Generally, these products possess substantial rigidity and bend only under comparatively high loads, although in some cases, pliable polymers may be prepared. The glass polymer possesses a high tensile strength and considerable elasticity. Thus, a sheet deformed under a load generally tends to assume its original shape when the load is released. These polymers contain a higher concentration, generally 90 percent or more of insoluble material.

In accordance with the present invention, it has been found that the products may be polymerized to form strong, unfractured products by conducting polymerization of the compounds herein contemplated under conditions such that strains exceeding the rupture point of the polymer are prevented from being established whereby a major portion of the tension established within the polymer during polymerization is released before the polymer fractures and generally before the rigid or glassy polymer is produced. When polymerization is conducted in a mold the surface portion of the polymer is released from adherence to the mold surface whereby this portion of the polymer is permitted to shrink, thereby preventing the establishment of surface strains which might otherwise rupture the polymer. When the monomer or syrupy polymer is polymerized in a mold by the ordinary cast polymerization processes internal strains are established within the gel as polymerization proceeds through the gel state and ultimately these strains become so great that the tension within the polymer exceeds its rupture point, whereby fractures are formed. While the gel has previously been regarded as incapable of contraction, it has now been discovered that if it is freed from the mold surface or if the gel is prevented from adhering tenaciously to such surface, the gel is capable of shrinking to an extent such that a major portion of the internal tension is released, whereby unfractured glassy polymers may be secured. Generally, this shrinkage is effected by freeing a surface or surfaces of the polymerized gel from the mold to permit the polymer to shrink and thereafter, polymerization is continued. If necessary, this process may be repeated, or if desired, the further polymerization may be conducted in a manner such that gradual shrinkage particularly of the surface portion adjacent the mold may be permitted to occur during the polymerization by methods hereinafter more fully described.

The invention is particularly related to the treatment of polyesters of polybasic acids containing at least two unsaturated groups which are unconjugated with each other through carbon. Thus, the invention may be applied to the unsaturated alcohol polyesters of polybasic acids such as the esters of oxalic, maleic, malic, malonic, adipic, succinic, itaconic, citric, tartaric, fumaric, phthalic, sulphuric, carbonic, silicic, phosphoric, or titanic acids or other acids such as diglycollic, or dilactic acid, etc., and unsaturated alcohols containing up to 10 carbon atoms, such as allyl, vinyl, methallyl, β-ethyl allyl, crotyl, isocrotyl, 2-chloroallyl, methyl vinyl carbinyl, isopropenyl, isobutenyl, butadienyl, propargyl, cinnamyl, linallyl, or tiglyl alcohol. Mixed esters such as vinyl-allyl, vinyl-crotyl, vinyl-methallyl, methallyl-allyl esters may also be subjected to treatment. Likewise, the invention may be applied to treatment of the esters formed by reaction of a polyhydric compound such as ethylene glycol, propylene glycol, or butylene glycol, or the corresponding polyglycols, trimethylene glycol, hexamethylene glycol, glycerol, methyl glycerol, resorcinol, hydroquinone, phthalyl alcohol, polyvinyl alcohol, hydrated cellulose, soda cellulose, etc., with unsaturated haloformates such as allyl or methallyl chloroformates or acid esters of polybasic acids and unsaturated alcohols such as allyl, methallyl, or crotyl acid oxalate, acid phthalate, acid maleate, acid succinate, acid adipate, or other compound described in copending application for Letters Patent of Franklin Strain and Irving E. Muskat, Serial No. 361,280, filed October 15, 1940, including esters of hydroxy acids esterified with unsaturated alcohols such as vinyl, allyl, or methallyl lactate, glycolate, or salicylate and esters of polybasic acids which are partially esterified with unsaturated alcohols such as allyl, methallyl, crotyl or other chloroformate, allyl, methallyl, or other acid phthalate, acid maleate, acid succinate, etc., with the above unsaturated alcohols such as are described in applications of Franklin Strain and Irving E. Muskat, Serial No. 365,103, filed November 9, 1940, and Serial No. 392,103, filed May 6, 1941.

Other polymers may be secured by treatment of unsaturated alcohol esters of unsaturated acids such as crotonic, propiolic and cinnamic acid esters of the above unsaturated alcohols, or the more actively polymerizable esters such as acrylic or alpha ethyl, alpha chloro or other alpha, halo, or alpha alkyl substituted acrylic acids and unsaturated alcohols, although in such a case difficulty may be encountered in securing a polymer in the gel state in view of the rapidity with which these materials polymerize to the infusible state. In addition, other compounds containing at least two unsaturated groups, preferably those which are unconjugated with respect to each other through carbon, such as glycol or glycerol polycrotonate, polyacrylate, polymethacrylate and polychloracrylate. Moreover, the ester amides corresponding to the above-mentioned esters such as the allyl or methallyl esters of phthalamide or adipamide may be treated as herein described as well as substituted ureas such as diallyl urea, dicrotyl urea, NN ethyl diacrylamide, etc. Likewise, unsaturated alcohol esters of amino acids such as carbamic acid, sulphamic acid, glycine, etc. may be reacted with aldehydes such as formaldehyde, acetaldehyde, etc. to form bis alkilidine esters and the compounds thus prepared treated in accordance with the present invention.

In order to obtain products of maximum hardness, it is desirable to utilize compounds wherein the number of carbon atoms in the monomeric molecule is not excessive. Thus, allyl esters polymerize to form substantially harder products than the polymer produced by direct polymerization of oleyl esters. Other things being equal, the trend toward softer products increases as the number of carbon atoms per unsaturated group increases. The trend toward softer products with increase in carbon atoms may be minimized by increasing the number of polymerizable groups in the composition. In general, it is preferred to make use of agents wherein the ratio of the number of carbon atoms to the number of polymerizable unsaturated groups does not exceed 15, and preferably, the number of carbon atoms in either the acid or alcohol radical should not exceed about 10.

The polymerization of the products under conditions such as to permit release of tension within the polymer during polymerization may be conducted by various methods. Generally, the polymerization is conducted by means of heat and/or light such as ultra-violet light and in the presence of an oxygen catalyst such as oxygen, ozone, peroxides such as lauryl, benzoyl or tetralin peroxides, etc. In accordance with one suitable modification, the compound to be polymerized is placed in a mold, either as a monomer or as a syrupy partially polymerized product and is further polymerized until the product solidifies to a gel. Approximately as soon as a gel which is sufficiently coherent to permit removal of the gel from the mold is formed, the gel is freed from the surfaces of the mold and the gel, particularly the surface portion thereof, permitted to shrink whereby internal strains are released. This process is particularly effective in the polymerization of sheets of substantial size where a large shrinkage longitudinally and laterally of the sheet occurs upon removal of the sheet from the mold. Because of the low resistance of the gel to tearing, care is required in removing the gel from the mold surface in order to prevent the gel from tearing. The pliable gel may be shaped to convenient form and further cured to complete the polymerization. Generally, this is done by placing the pliable gel into a mold of suitable shape for further curing.

The time at which the gel should be released from the mold surface is determined by the nature of the gel and varies widely with different materials, different catalyst concentration, presence of inhibitor, etc. Accordingly, no hard and fast rule may be laid down. If it is attempted to release the gel before it has developed sufficient strength, it may tear during the releasing operation. On the other hand, if the releasing is delayed too long, fracturing occurs. In general, the time when the gel should be released should be ascertained by preliminary tests. Roughly, the time may be determined by determination of the percent of insoluble matter present in the gel. This may be done by disintegrating a weighed portion of the gel, extracting the gel overnight with a solvent for monomer and soluble polymer such as acetone, chloroform, carbon tetrachloride, xylene, etc., and determining the weight of undissolved matter. For most purposes, the percent insoluble in the gel should exceed 20 percent by weight of the gel, but generally, should not be in excess of about 75 percent by weight. Preferably, gels containing 35 to 65 percent by weight of insoluble matter therein are treated in accordance with this invention.

In polymerizing comparatively thick castings, for example, in excess of one inch in thickness, complete release of the gel may not be essential provided the size of the casting is not excessive. In such cases it has been found that the edges of the gel may be released without release of the upper and/or lower surfaces thereof. This is particularly true when the upper surface has been left out of contact with a mold surface. Upon release of the edges of such gels the gel shrinks to a substantial degree at all points except adjacent the mold surface where the gel has been unreleased. While these sections may remain under tension the strength of the thick gel is sometimes sufficient to withstand any tendency toward fracturing due to this localized stress.

The invention is particularly applicable to the production of polymer sheets of substantial size. Sheets of various thicknesses from one-eighth of an inch or less and upward may be prepared in this manner. In such a case the compound may be polymerized to the gel in a suitable horizontal mold provided with side walls. Generally, the polymerization is conducted without contacting the upper surface of the polymerizing liquid with a mold surface. In such a case, if the polymerization is conducted in air, polymerization adjacent the upper surface of the polymerizing composition may be materially minimized and may remain tacky even when the opposed surface is non-tacky. This may be avoided, if desired, by conducting polymerization in an inert atmosphere such as an atmosphere of carbon dioxide. In many cases, however, it is desirable to minimize polymerization adjacent the upper surface of the polymer and in such cases, polymerization is conducted with the exposed surface in contact with air. If desired, thick blocks may be cast in the manner herein described and the block of gel thus obtained may be sliced into thin sheets and further cured.

The conditions required for polymerizing to form the gel may vary considerably in accordance with the activity of the compound being polymerized, catalyst concentration and temperature. Generally, the temperature of polymerization should be maintained sufficiently low to insure the presence of enough catalyst in the gel to permit the further polymerization to the infusible state. This is generally essential in dealing with allyl, methallyl, and similar esters of polybasic acids including the complex mixed esters such as ethylene glycol bis (allyl carbonate).

The polymers thus obtained may be further polymerized to convert them from the gel to tough products by heat and/or light. Often it is desirable to coat these polymers while in the gel state with a polymerizable material and to further cure the coated polymer, preferably in contact with a smooth surfaced mold capable of imparting a press polished surface to the polymer such as a glass or highly polished metal plate. The polymerizable material used for coating the surface of the gel may be of the same or a different material from that which the gel was produced and may be in the form of monomer or syrupy or fusible polymer. Thus, the gel may comprise a polymer of a material capable of forming a tough, flexible polymer, such as diethylene glycol bis (methallyl carbonate) while the surfacing polymer may comprise a compound which polymerized to form a harder, more abrasion-resistant polymer, such as allyl or methyallyl acrylate, methacrylate or chloracrylate, glycol dimethacrylate, glycerol trimethacrylate, or the corresponding acrylate or chloracrylate, diallyl or dimethallyl phthalates or maleate or fumarate, or ethylene glycol bis (allyl carbonate), etc. In such a case it is possible to obtain a tough resilient polymer surfaced with a harder material which is more resistant to penetration. By application of the coating to the polymer while the polymer is in the gel state, it is found that in many cases the adhesion is superior to that obtained when the coating is applied to the completely polymerized material. Moreover, application of a polymerizable coating permits production of a superior surface and thus, it is often desirable to coat the gel with the same monomer from which the gel has been obtained or a fluid polymer or a solution of a fusible polymer thereof.

The coated gel may be subjected to shaping or forming treatment, if desired, and may be treated to complete the polymerization by subjection of the polymer to heat and/or light. Polymerization at temperatures of 50 to 90° C. followed by a final treatment at 100 to 125° C. is generally suitable. As previously noted, it is found desirable to apply a smooth surfaced mold such as glass or highly polished metal plate to the coated surface. Only light pressure is generally applied since otherwise the coating may be squeezed from under the plates or the gel may be fractured.

During further polymerization it is often desirable to release the polymer from the mold one or more times to prevent fracturing. This may be done after the coating has set into a gel and remains only slightly tacky. When this coated gel is being subjected to polymerization by heating, the polymer is preferably cooled to about room temperature after releasing from the mold before the press polishing plate or plates are replaced since otherwise, defects may develop in the coated surface.

In many cases it is found to be difficult to secure a suitable coating by application of monomer alone to the gel surface since in such a case the monomer may be squeezed out upon application of the surfacing plates. Accordingly, it is found desirable to apply a partially polymerized product having substantial viscosity such as a syrup obtained by polymerization of an organic oxygen compound containing at least two unsaturated polymerizable groups and interrupting polymerization before the gel is formed and while the mixture remains in liquid state. This syrup may then be applied and is found to possess sufficient resistance to flow to permit application of suitable films.

In accordance with a further modification, the coating may be polymerized until a solid polymer is formed prior to application of the smooth surfaced mold. Thereafter, the plates may be applied and the product polymerized until the coating is non-tacky. This method avoids exudation of monomer in cases where this difficulty might otherwise be encountered.

During the time at which the gel is removed from the mold and coated, it is generally desirable to interrupt polymerization. With many of these materials this may be done by cooling the gel to room temperature. On the other hand, more active materials may require chilling to low temperatures. In dealing with very active substances such as allyl or methallyl methacrylate or glycol dimethacrylate, the production of the gel required special precautions and generally, it is desirable to polymerize such materials in the presence of an inhibitor such as hydroquinone or a diluent such as a slowly polymerizable material, for example, crotyl crotonate, dicrotyl phthalate, etc., in order to decrease the rate of polymerization to an extent such that a gel may be obtained.

The temperature required for polymerization of the compounds herein contemplated in order to produce the gel and also, to further cure the gel is dependent upon the nature of the compound being polymerized and especially upon the catalyst used. In general, it may be stated that the temperature should not exceed the temperature at which the peroxide catalyst decomposes spontaneously and should be maintained sufficiently below this temperature to insure the presence of catalyst in the gel until polymerization has proceeded to a desired degree. Using benzoyl peroxide as a catalyst, polymerization to the gel state at a temperature of 50 to 90° C. is found to be preferable. The gel is, in general, further cured at 70 to 90° C., and finally cured at a somewhat higher temperature, for example, 100 to 125° C. Finally, the residual catalyst may be completely destroyed by raising the temperature to a sufficiently high level for example, 150° C. With catalysts such as acetone peroxide, the permissible temperature limitations, particularly in the final stages of cure may be considerably higher. On the other hand, certain catalysts decompose too rapidly at the specified temperatures and accordingly, lower temperatures are required.

The following examples are illustrative:

Example I

Diallyl phthalate containing 5 percent by weight of benzoyl peroxide was heated at a temperature of 70 to 80° C. until the liquid thickened and the viscosity had increased approximately 500 percent. 500 grams of this thickened monomer was poured into a glass tray 14 inches long. The tray was heated in an oven at 75° C. for 3 hours. The tray was then taken from the oven and the sides removed. The gel resting on the bottom of the plate was allowed to cool to 50–60° C. A strip of gel 0.5" wide was cut from the sides, employing a razor blade with a straight edge. The gel was then lifted from the plate and allowed to cool to room temperature. Upon removal from the plate it shrank approximately ¼" in length and width. The gel was very flexible and slightly elastic. It possessed a slight blue fluorescence. The surface exposed to the atmosphere during the heating period was tacky.

A portion of the gel trimmed from the sides contained 3.2% of benzoyl peroxide and 44% of acetone-insoluble materials.

100 g. of thickened monomer was poured upon a tempered glass plate 18 inches square. The monomer was concentrated in a pool along one side of the plate. The gel was placed, tacky side downward, over the pool of monomer and rolled onto the plate from one edge thereof to the other by means of a cylindrical tube in such a way as to force the pool of monomer across the plate to the opposite side, whereby air was squeezed from between the plate and the polymer and the glass and polymer surfaces were completely coated.

A second pool of thickened monomer 100 g., was poured along a side of the exposed surface of the gel. A second tempered glass plate was lowered over the pool of monomer in a manner resembling the closing of a book, whereby the monomer was forced to flow to the opposite side to coat the plate and the gel surface and to avoid air entrapment. Excess monomer was drained from the plates and swabbed from the sides of the gel.

The resulting sandwich was heated in an oven at 75° C. for 2 hours. Thereafter, the temperature of the oven was raised to 100° C. and heating continued for one-half hour. The plates were then pried apart and the sheet removed from the oven. The sample was pulled from the bottom plate, to which it adhered tenaciously, and allowed to cool, at this stage the sample was colored slightly yellow when viewed edgewise and possessed a blue fluorescence. The sample was heated for 2 hours between tempered glass plates at a temperature of 100° C. and then allowed to cool between the plates. A sheet of transparent polymer $\tfrac{3}{16}$ inch in thickness was thus obtained.

Example II

A quantity of partially polymerized ethylene glycol bis (methallyl carbonate) was prepared by heating monomeric ester containing 5 percent by weight of benzoyl peroxide until the viscosity increased 500 percent. The thickened monomer was then poured into a 14" x 14" tray as in Example I and heated at 80° C. for 90 minutes.

The gel was colorless, flexible and tacky on the surface exposed during the heating period. By analysis of samples thereof, peroxide content was found to be 2.8 percent by weight and the acetone-insoluble content was 52 percent by weight.

The gel was removed from the tray to permit shrinkage and was coated with further thickened monomeric ethylene glycol bis(methallyl carbonate) and placed between tempered glass plates using thickened monomer on both sides of the gel as described in Example I. The resulting sandwich was placed in an oven and heated at 80° C. for one hour and thereafter, the product was heated at 100° C. for one hour. At this time the plates were removed from the sheet as in Example I and the product was heated at 100° C. for 2 hours. A clear, hard and apparently haze-free sheet $\tfrac{3}{16}$ inch in thickness was obtained.

Example III

The process of Example I was repeated using diethylene glycol bis (methallyl carbonate) to produce a flexible, colorless gel which was tacky on one side. The gel was provided with coatings on both sides and placed between tempered glass plates as described in Example I. The sandwich was heated for 75 minutes at 80° C. and then at 100° C. for 2 hours. The sheet was then removed from the plates and heated at 100° C. for 2 hours.

Example IV

A quantity of partially polymerized ethylene glycol bis (allyl carbonate) was prepared by heating monomeric ester containing 5 percent by weight of benzoyl peroxide at a temperature of 70° C. until the viscosity increased 200 percent. The thickened monomer was then poured into a 14" x 14" tray as in Example I and heated for 250 minutes at a temperature of 70° C. The gel was removed from the tray and provided with coatings of a further portion of partially polymerized ethylene glycol bis (allyl carbonate) on both sides and placed between tempered glass plates as described in Example I. The thickened monomer used for coating had been polymerized to a viscosity increase of 500 percent at a temperature of 70° C. The sandwich was heated for one hour at 75° C. and then at 100° C. for 15 minutes. The sheet was then removed from the plates and heated at 100° C. for 30 minutes.

*Example V*

The process of Example I was repeated using diethylene bis (methallyl carbonate) to produce a flexible, colorless gel which was tacky on one side. The tacky portion was scraped off with a razor blade. The gel was provided with coatings and placed between tempered glass plates as described in Example I, using for the coating agent a solution of 5 percent by weight of benzoyl peroxide in glycol bis (allyl carbonate) thickened to a viscosity increase of 500 percent by heating at 70° C.

The sandwich was heated at 75° C. for 1.5 hours and then for 1.5 hours at 90° C. The sheet was then removed from the plates and heated at 100° C. for 2 hours.

*Example VI*

A quantity of thickened diallyl phthalate was prepared as in Example I. At the same time a gel was prepared from diethylene glycol bis (methallyl carbonate) as in Example III, and the gel thus prepared was coated with the thickened diallyl phthalate as in Example I. The coated sheet was placed between glass plates and heated at 75° C. for 2 hours and, thereafter, the temperature was raised to 100° C. for one-half hour. The plates were then pried apart and the sample heated for 2 hours between glass plates at 100° C. whereby a glass sheet having a comparatively flexible interior and a hard, tough surface was obtained.

Although the present invention has been described with particular reference to the specific details of certain embodiments thereof, it is not intended that such details shall be regarded as limitations upon the scope of the invention except insofar as included in the accompanying claims.

I claim:

1. A method of preparing a rigid sheet of a transparent polymer of an ester containing two unsaturated radicals having unsaturation in an aliphatic carbon chain and having the unsaturation attached to the second carbon atom from a connecting oxygen atom which method comprises polymerizing the liquid ester in contact with a smooth rigid mold to which the solid polymer adheres, continuing the polymerization until a soft rigid gel containing 20 to 75 percent of an acetone insoluble gel is formed, inducing uniform contraction by releasing the polymer from the mold and further polymerizing.

2. A method of preparing a rigid sheet of an ester capable of being polymerized first into a soft, rigid gel containing 20 to 75 percent of an acetone insoluble polymer and subsequently into a hard substantially acetone insoluble polymer which method comprises polymerizing in contact with a smooth rigid surface to which the solid polymer adheres, continuing the polymerization until said soft rigid gel is obtained, inducing uniform contraction by freeing the polymer from the adhering mold surface and completing the polymerization.

3. The method defined by claim 1 in which the ester is ethylene glycol bis (allyl carbonate).

4. The method defined by claim 1 in which the ester is an ester of allyl alcohol.

5. The method defined by claim 1 in which the ester is an ester of methallyl alcohol.

6. The method defined by claim 1 in which the ester is diallyl phthalate.

ALBERT G. CHENICEK.